United States Patent [19]

Srivastava

[11] Patent Number: 4,754,321

[45] Date of Patent: Jun. 28, 1988

[54] INTEGRATABLE COLOR CORRECTION CIRCUIT

[75] Inventor: Gopal K. Srivastava, Arlington Heights, Ill.

[73] Assignee: Zenith Electronics Corporation, Glenview, Ill.

[21] Appl. No.: 916,134

[22] Filed: Oct. 7, 1986

[51] Int. Cl.[4] .............................................. H04N 9/77
[52] U.S. Cl. .......................................... 358/28; 358/27
[58] Field of Search .............................. 358/21, 28, 27; 307/353, 352

[56] References Cited

U.S. PATENT DOCUMENTS

| | | | |
|---|---|---|---|
| 4,219,840 | 8/1980 | Srivastava | 358/28 |
| 4,285,005 | 8/1981 | Srivastava | 358/28 |
| 4,296,432 | 10/1981 | Engel et al. | 358/28 |
| 4,549,098 | 10/1985 | Fushiki | 307/352 |

OTHER PUBLICATIONS

"Analog-Digital Conversion Handbook" by The Engineering Staff of Analog Devices, Inc. Analog Devices, Inc., pp. III 84–85, 1972.

Primary Examiner—James J. Groody
Assistant Examiner—David E. Harvey

[57] ABSTRACT

A color signal correction circuit matrixes the R−Y and B−Y color difference signals to develop an I axis signal for application to a signal correction circuit. The I axis signal is also supplied to a comparator which feeds a counter, the output of which is connected to a digital-to-analog converter that, in turn, supplies the comparator and the color signal correction circuit. The comparator and the counter are enabled during the color burst time when there is no color in the color difference signals. The DC level of the I matrix is determined by the count in the counter to enable the color signal correction circuit to determine the polarity and magnitude of the I axis signal and provide appropriate correction to the B−Y color difference signal.

1 Claim, 1 Drawing Sheet

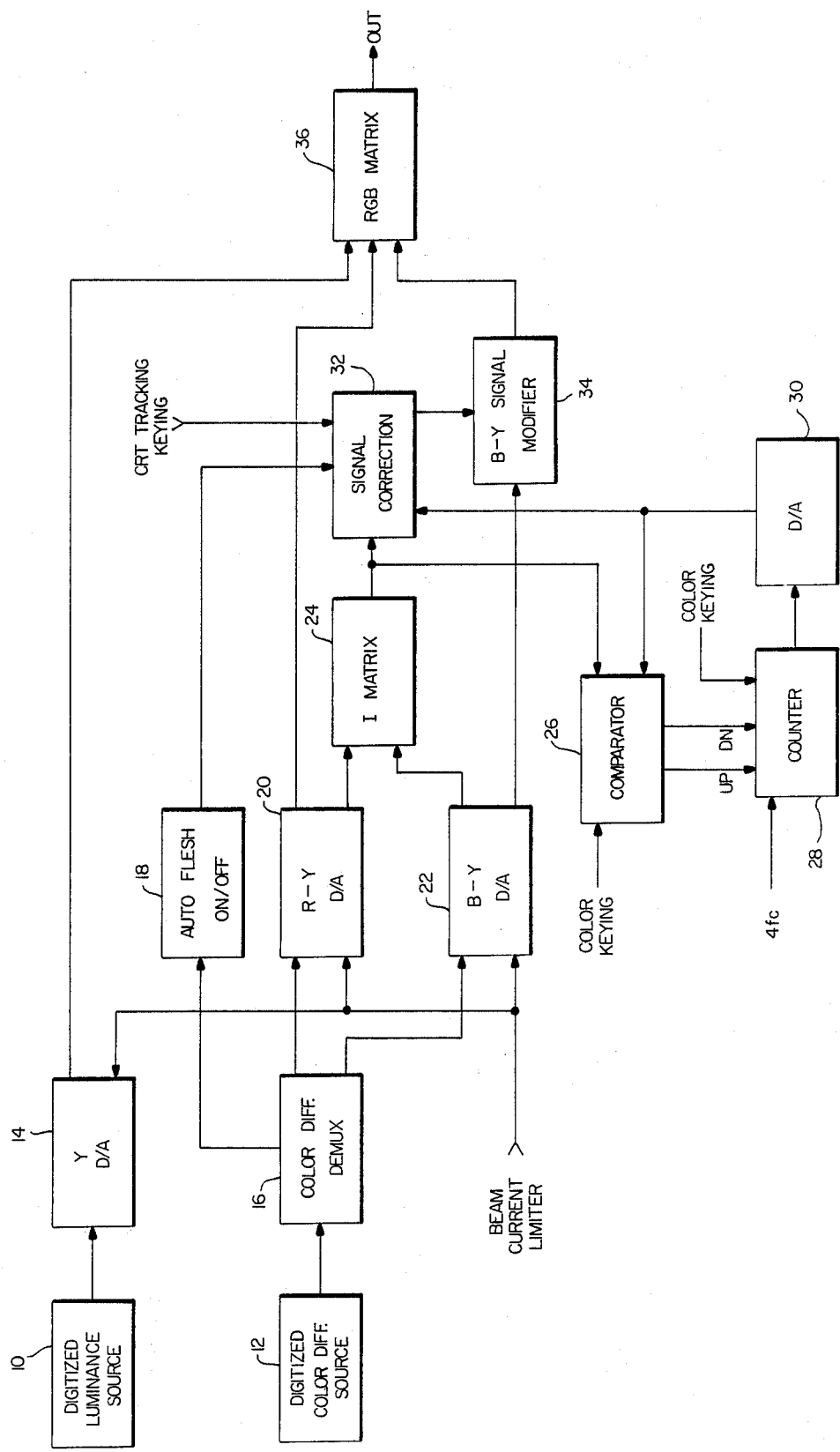

INTEGRATABLE COLOR CORRECTION CIRCUIT

BACKGROUND OF THE INVENTION

This invention relates in general to color signal correction circuits and, in particular, to a color signal correction circuit that is entirely integratable. In the NTSC color television system, as in any color television system, human flesh tones are difficult to produce consistently well. This is due to a variety of well-known factors. Unfortunately, the human eye is very sensitive to errors in flesh tone, and any tendency for flesh tones to shift toward either green or purple is instantly recognizable. Consequently, many circuits for augmenting flesh tone colors have been developed and used. Such circuits generally operate on the basis that flesh tones are primarily located along the +I axis, which essentially encompasses orange tones. Prior art circuits combine portions of the R−Y and B−Y color difference signals to develop signals lying along the I axis. As is well known, since the gamut of flesh tones generally lie along the +I axis, the developed I axis signal is indicative of the amount and amplitude of flesh tone colors in the received video. There are correction circuits in the prior art that enhance or augment signals lying along the +I axis based upon their amplitude. In accordance with conventional terminology, the red, green and blue video signals are referred to as R, G and B, respectively, and the luminance or monochrome signal is referred to as Y. The three color difference signals are thus R−Y, G−Y and B−Y.

In U.S. Pat. No. 4,219,840, issued Aug. 26, 1980, and U.S. Pat. No. 4,285,005, issued Aug. 18, 1981, both in the name of the present inventor, an automatic color corrector circuit enables color correction of chroma signals within a selected range of the flesh tone axis by combining the outputs of the chroma demodulators to develop a control signal in response to which a color modifier automatically reduces the gain of the B−Y demodulator by a predetermined factor. The color modifier also adds a predetermined negative B−Y component of fixed value to the output of the B−Y demodulator for helping to correct flesh tone chroma signals which might otherwise have an unnatural cast. The circuit described may be readily fabricated in integrated form since it does not use any variable resistors or capacitors.

U.S. Pat. No. 4,296,432, issued Oct. 20, 1981, describes and claims a joint invention of the present inventor comprising a dynamic enabling network for turning on and off a color corrector circuit. The network receives and combines selected color difference signals (R−Y and B−Y) that are superimposed on a DC bias level for generating a first control signal, the amplitude of which is near a maximum when the color difference signals are representative of flesh tone hues. A second, DC control signal, also derived from the R−Y and B−Y color difference signals, has an amplitude that is a function of the DC bias level associated with these color difference signals. The DC in these control signals is offset and the color corrector circuit is enabled only when the difference in amplitude between them is indicative of flesh tone hues of a minimum amplitude. That circuit suffers the drawback of utilizing a capacitor in a sample-and-hold circuit for developing the second, DC control signal. It is not easily preferable to integrate the capacitor because it consumes a large area, and consequently, an extra pin is required on the integrated circuit for connecting the capacitor thereto. All of the three above-mentioned patents are hereby incorporated by reference herein.

The present invention eliminates the need for the capacitor in the sample-and-hold circuit by providing a counter and a digital-to-analog (D/A) converter for developing a DC potential as a function of the count in the counter. The color signal correction circuit is utilized in an all-digital television environment and enables maximum utilization of integrated circuitry.

OBJECT OF THE INVENTION

A principal object of the invention is to provide an improved color signal correction circuit for a television receiver.

Another object of the invention is to provide a color signal correction circuit of particular applicability to a digital television receiver.

A further object of the invention is to provide a novel color signal correction circuit for a color television receiver that is automatically enabled based upon the amplitude of flesh tones in the color signal.

BRIEF DESCRIPTION OF THE DRAWING

Other objects and advantages of the invention will be apparent upon reading the following description in conjunction with the drawing, the single figure of which is a simplified block diagram of a color signal correction circuit constructed in accordance with the invention.

DESCRIPTION OF THE PREFERRED EMBODIMENT

Referring to the drawing, a digitized luminance signal source 10 is coupled to a Y D/A converter 14 and thence to an RGB matrix circuit 36. An associated source of color difference signals 12 comprises the digitized R−Y and B−Y color difference signals from a video processor unit (not shown), in time multiplexed format. The signal source 12 is applied to a color difference demultiplexer circuit 16 to develop R−Y and B−Y digital color difference signals. The digital R−Y color difference signal is applied to an R−Y D/A converter 20 and the digital B−Y color difference signal is applied to a B−Y D/A converter 22. A third output from demultiplexer 16 is applied to an automatic flesh tone ON/OFF detection circuit 18. The function of the automatic ON/OFF circuit 18 is to activate or deactivate the flesh tone correction system. This is achieved by supplying an ON or OFF signal to a correction circuit 32. The automatic flesh tone system is activated by the viewer by setting a bit in a particular register in the RAM of the microprocessor (not shown). The status of the auto flesh tone ON/OFF bit is transmitted by the microprocessor to auto flesh ON/OFF circuit 18 via the color difference source 12 and color difference demultiplexer 16. The transmission of the auto flesh tone ON/OFF bit occurs during the vertical blanking period when various other data are transmitted to perform automatic cathode ray tube (CRT) tracking. The automatic CRT tracking adjusts the white balance of the picture tube to preselected levels. The signal correction circuit 32 is also deactivated during CRT tracking by a keying pulse which occurs during vertical blanking. This is done to assure that operation of signal correction circuit 32 will not interfere with automatic CRT tracking. One output each of R−Y and B−Y D/A converters 20 and 22 is supplied to an I matrix circuit 24 where a selected proportion of each of the R−Y and B−Y signals is used to develop a resultant signal lying along the I axis. The output of I matrix 24 is supplied to a color signal correction circuit 32 along with an output from automatic flesh tone on/off circuit 18. The output of I matrix 24 is also supplied to a comparator 26, another input of which is supplied from a D/A converter 30 which, in turn, is coupled to the output of a counter 28 having its up/down control inputs coupled to the output of comparator 26. Counter 28 is supplied with a clock signal of about four times the frequency of the color subcarrier at its clock input and a color keying signal corresponding to the occurrence of the color burst reference in the television signal. Comparator 26 is also supplied with the color keying signal. The output of B−Y D/A converter 22 is supplied to a B−Y signal modifier 34 which s supplied with the output of color signal correction circuit 32. The outputs of R−Y D/A converter 20 and B−Y signal modifier 34 are supplied to RGB matrix 36 where the color video signal is reconstructed for application to further processing circuitry and to a color picture tube for display (neither of which is shown). Only the circuitry of interest to the present invention, namely, that for developing a signal correction for flesh tones, is disclosed. It will also be noted that the circuit operates substantially as the one described in the above-mentioned U.S. Pat. No. 4,296,432 with the exception that the sample-and-hold function provided by the voltage divider, comparator and capacitor in that patent has been replaced by comparator 26, counter 28 and D/A converter 30.

In operation, the output of I matrix 24 comprises a DC bias level upon which is superimposed the AC color difference signals—all referenced to the I-Q axis. During occurrence of the color burst reference on the "back porch" of the horizontal sync pulse, there is no color information present and at that point, the output of I matrix 24 consists purely of its DC bias level. The color keying signal enables comparator 26 to sample the output of I matrix 24 during the occurrence of the color burst, and consequently, the signal applied from I matrix 24 to comparator 26 is a DC level. Similarly, counter 28 is "turned on" during the color burst interval by the color keying signal, and the result of the comparison in comparator 26 generates either an up or a down signal (assuming the comparator inputs are not equal) to counter 28. The comparison is between the DC level of the I matrix output, which is analog, and the analog voltage applied to the other input of comparator 26 which is determined by the existing digital count in counter 28. Thus, counter 28 may start at any arbitrary count. During the color keying signal, comparator 26 compares the DC level or bias of the I axis signal with the DC voltage from D/A converter 30 for the particular count in the counter. If that DC voltage is higher than the DC level of the I axis signal, the comparator sends a "down" command to counter 28 which counts down a number of counts determined by the frequency of counting and the duration of the color keying signal. At the next comparison, counter 28 will either receive a further down signal or neither an up nor a down signal if the analog value of the digital count therein at the time agrees with the analog value of the DC output of I matrix 24. Counter 28, therefore, adjusts its count to match the DC bias level of the output of I matrix 24. The circuit functions as a sample-and-hold circuit and enables the color signal correction circuit 32 to determine whether the I axis signal is positive or negative and to determine its magnitude. This, of course, is critical since flesh tones lie along the +I axis only, and it is not desired to correct signals that lie along the −I axis. Further, as the magnitude of the I axis signal decreases, less correction is desired since that indicates that the color signals tend toward the 90°-displaced Q axis rather than the I axis.

The operation of the basic circuit is well known and fully described in the above-referenced patents. It is the apparatus for determining the I axis signal DC level that is the difference between the present invention and the disclosure in U.S. Pat. No. 4,296,432. Once the magnitude of the +I axis signal is determined, color signal correction circuit 32 decreases the amplitude of the B−Y signal and adds a predetermined value offset signal thereto for modifying the signals to more nearly lie along the I axis for flesh tone correction. The circuit is fully integratable and well suited for use with a digital-type television receiver.

What has been described is a novel circuit for use in an automatic flesh tone correction system that does not require a capacitor sample-and-hold circuit. It is recognized that numerous modifications in the described embodiment of the invention will be apparent to those skilled in the art without departing from its true spirit and scope. The invention is to be limited only as defined in the claims.

What is claimed is:

1. In a television receiver having a source of color difference signals, a color difference demultiplexer for developing R−Y and B−Y color difference signals therefrom, an I matrix circuit supplied with said R−Y and said B−Y color difference signals and enveloping therefrom an I axis signal having a DC component and a varying AC component indicative of the amount of flesh tone;

a color signal correction circuit for automatically adjusting the B−Y color difference signal as a function of the I axis signal, said color signal correction circuit having an input supplied with the output of said I matrix circuit;

a comparator having a first input coupled to the output of said I signal matrix circuit;

a counter operatively coupled to the output of said comparator;

a digital-to-analog converter connected to the output of said counter and supplying a second input of said comparator and being connected to said color signal correction circuit, said digital-to-analog converter developing a DC potential corresponding to the DC level of said I axis signal; and means for enabling said comparator and said counter during a portion of said color difference signals when there is no color present.

* * * * *